350-174
4/3/79   XR   4,147,433

United States Patent [19]
Drinkuth

[11] 4,147,433
[45] Apr. 3, 1979

[54] CONTOUR INSPECTION

[75] Inventor: William H. Drinkuth, Hebron, Conn.

[73] Assignee: United Technologies Corporation, Hartford, Conn.

[21] Appl. No.: 860,420

[22] Filed: Dec. 12, 1977

Related U.S. Application Data

[63] Continuation of Ser. No. 751,558, Dec. 17, 1976, abandoned.

[51] Int. Cl.² .................. G01B 11/24; G02B 27/14
[52] U.S. Cl. ........................... 356/390; 350/174; 356/391; 356/376
[58] Field of Search ................... 356/163–166; 350/174

[56] References Cited

U.S. PATENT DOCUMENTS

| 2,607,267 | 8/1952 | Fultz et al. | 356/163 |
| 2,741,153 | 4/1956 | Reason et al. | 356/166 |
| 3,271,097 | 9/1966 | Montremy et al. | 352/134 |

FOREIGN PATENT DOCUMENTS 1385912  5/1975  United Kingdom ............ 356/164

Primary Examiner—John K. Corbin
Assistant Examiner—Wm. H. Punter
Attorney, Agent, or Firm—Robert C. Walker

[57] ABSTRACT

A method and apparatus for inspecting the contour of an article is disclosed. Nondestructive viewing techniques including the projection of a light pattern onto the article to be inspected and the imaging of said light pattern to a display screen are discussed. The concepts taught enable the viewing of article regions which were formerly obstructed in conventional viewing systems.

9 Claims, 4 Drawing Figures

CONTOUR INSPECTION

BACKGROUND OF THE INVENTION

This is a continuation of application Ser. No. 751,558 filed Dec. 17, 1976, now abandoned.

FIELD OF THE INVENTION

This invention relates to inspection of contoured objects, and particularly, to the inspection of chord shapes of blades and vanes of gas turbine engines.

DESCRIPTION OF THE PRIOR ART

Modern gas turbine engine designs result from the intensive analytical and empirical evaluation of complex fluid reaction surfaces. Accurate contouring of the fluid reaction surfaces during manufacture is requisite to the implementation of these intricate and precise designs. Contour inspection at manufacture insures compliance with the developed design.

Much of the apparatus developed in the past for inspection of complex contours has been specifically directed to the inspection of chord shapes of blades and vanes of gas turbine engines. The above notwithstanding, designers and manufacturers are continuing to devote substantial economic and valued personnel resources to the development of simplified apparatus with improved image resolution.

Known apparatus includes that described in U.S. Pat. No. 2,607,267 to Fultz et al. entitled "Optical System for the Inspection of Curved Profiles". In Fultz et al. a light pattern is projected onto the contour to be inspected. A plurality of lenses, having optical axes which are oblique to the plane of the article cross section to be inspected, project an image of the pattern onto a viewing screen. A plurality of mirrors and additional lenses are employed to form a composite image of the pattern at the viewing screen.

Other systems employ lenses having optical axes perpendicular to the plane of the cross section. See U.S. Pat. No. 2,574,119 to Mottu entitled "Optical Controlling or Inspecting Arrangement for Verifying the Cross Sections of Pieces with Complex Profiles"; U.S. Pat. No. 2,737,080 To Mottu entitled "Optical Device for Examining the Cross Section of Parts Having an Intricate Outline", and U.S. Pat. No. 2,741,153 to Reason et al. entitled "Optical Projection Systems". As shown, these systems require large diameter, large relative aperture (Relative aperture is the ratio of aperture diameter to focal length off the lens.) lenses to collect adequate light for projection of the pattern image. Particularly large lenses are required to "see around" obstructions to the line of sight between the imaging lens and the inspected cross section.

SUMMARY OF THE INVENTION

A primary aim of the present invention is to provide methods and apparatus for inspecting the contours of articles having complex geometries. The projection of a contour image onto a display screen is an ultimate goal and, in an intermediate step the formation of a composite optical path, adapted to "see around" obstructions between a display screen and the contour to be inspected, is sought.

According to the present invention a composite optical path between the display screen of a contour inspection device and the article to be inspected is formed. The composite path comprises multidirectional views of which are joined at a beam splitter.

The primary feature of the present invention is the beam splitter. A pair of parallel mirrors bracket the light pattern on the article contour to be inspected and are optically aligned with the beam splitter to form a composite optical path emanating from the beam splitter. In one embodiment, a plurality of composite optical paths are formed and directed to a single imaging lens on the axis of the inspection apparatus.

A principal advantage of the present invention is the enhanced ability of the inspection apparatus to "see around" obstructions to the conventional line of sight. The concepts taught are particularly well adapted to the measurement of airfoil contours of vanes having integrally formed platforms.

The foregoing, and other objects, features and advantages of the present invention will become more apparent in the light of the following detailed description of the preferred embodiment thereof as shown in the accompanying drawings.

DETAILED DESCRIPTION

Detailed description of apparatus embodying the inventive concepts follows. Although the concepts are described in combination with inspection means employing a lens as an image focusing element, the concepts are not restricted to such a combination and are equally useful with other apparatus capable of processing a composite image.

Figure 1:
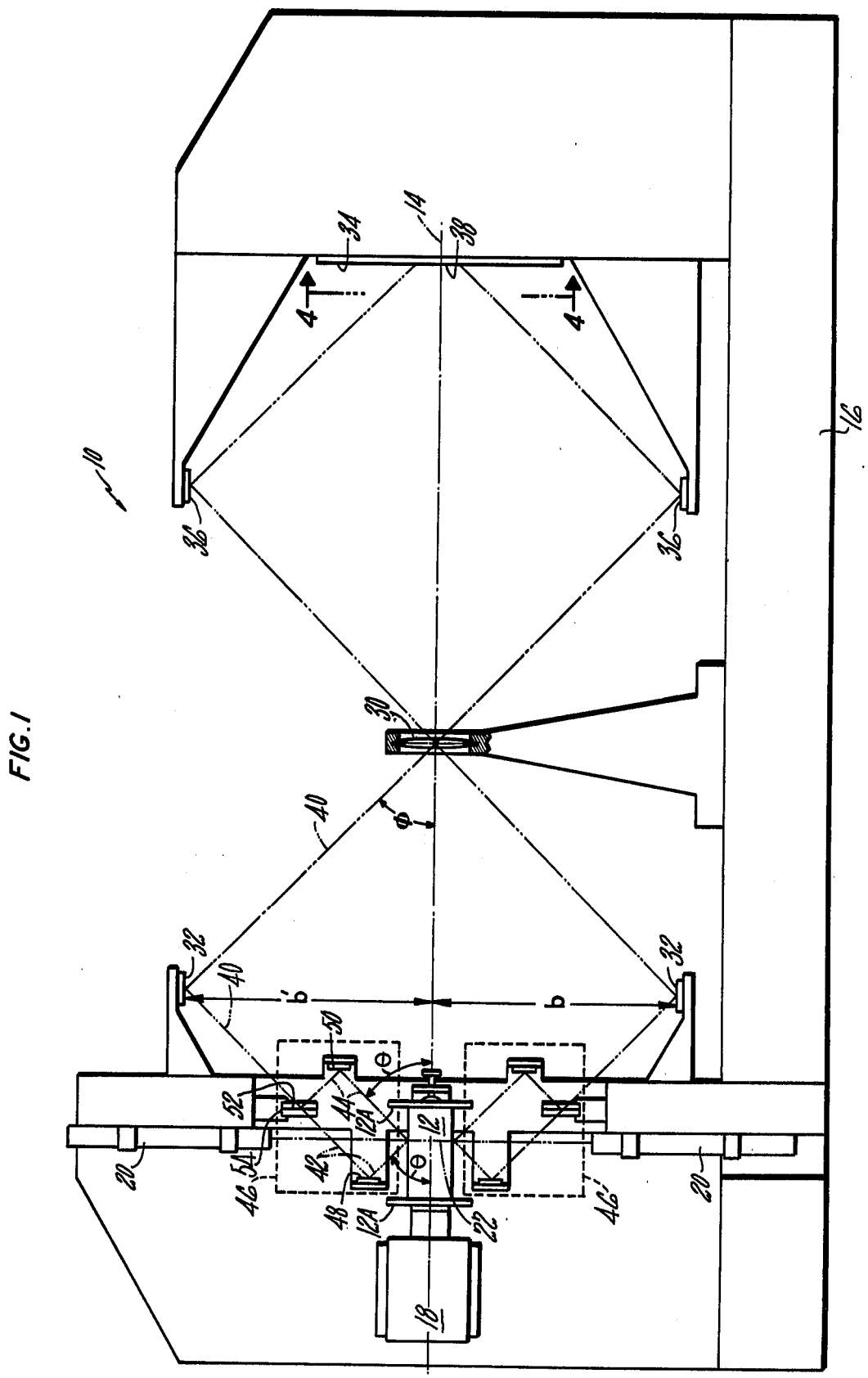
FIG. 1 is a simplified side elevation view of inspection apparatus constructed in accordance with the present invention.

Apparatus 10 for inspecting the cross section contour of an article 12 is shown in FIG. 1. The apparatus has great utility for inspecting the complex contours of gas turbine airfoils and is illustrated with respect thereto. The apparatus and methods of the present invention, however, are equally applicable to other contoured articles.

The components of the inspection apparatus 10 are oriented about an axis 14 which is perpendicular to the plane of an article cross section to be inspected. A base plate 16 is the reference structure to which the components are aligned. A fixture 18 for holding the article 12 is moveable in known relationship to the base plae to enable inspection of multiple cross sections.

One or more lighting systems 20 are adapted to project a light pattern 22 onto the article 12 at the cross section to be inspected. An imaging lens 30 is positioned on the axis 14 of the apparatus, the optical axis of the lens being coincident with the axis 14. The light pattern 22 is viewed by the lens along a composite optical path 40 which is reflected to the lens by an offset pattern mirror 32. The composite path is formed of a first segment 42 and a second segment 44 which are optically combined by a mirror system 46. Within the mirror system the light pattern 22 is reflected along the path 40 to the mirror 32 by a first forming mirror 48. The light pattern 22 is also reflected along the path 40 to the mirror 32 by a second forming mirror 50 and the reflective surface 52 of a beam splitter 54. At the beam splitter the light pattern 22, as reflected by the first forming mirror 48, and the light pattern 22, as reflected by the second forming mirror 50 and the reflecting surface 54 of the beam splitter, emanate in coincidence along the composite path 40.

In the embodiment shown, the pattern mirrors 32 are planar mirrors and are parallel to the axis 14. A dimensionally proportional image, as viewed along the composite path 40, is projectable directly from the lens 30 to a display screen 34, or as shown in FIG. 1, is redirected by one or more image mirrors 36 to the display screen at the axis 14. Redirection of the image to the axis 14 forms a composite image 38 which is representative in true dimensional proportion of the article cross section contour. Various known magnification techniques are employable with the described methods and apparatus without destroying the true proportional relationship of the cross section dimensions.

The article 12 illustrated is a stator vane of a gas turbine engine and has, integrally formed at the ends thereof, platforms 12A which comprise a portion of the flow path wall extending through an engine. The platforms 12A are an obstruction to conventional cross section viewing and, as such, impede normal inspection of the article. As is viewable in FIGS. 2 and 3, continuity of the optical path 40 to the imaging lens 30 is maintained notwithstanding interruptions in the first (42) or second (44) segments forming the composite path. Viewing of the cross section closely adjacent either platform 12A is enabled.

Figure 2:
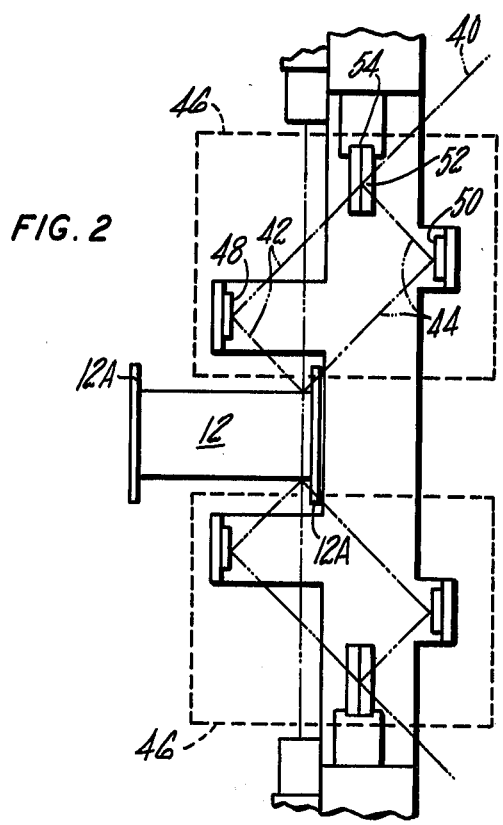
FIG. 2 is a simplified illustration of a portion of the inspection apparatus aligned to an obstructed region of a vane.
Figure 3:
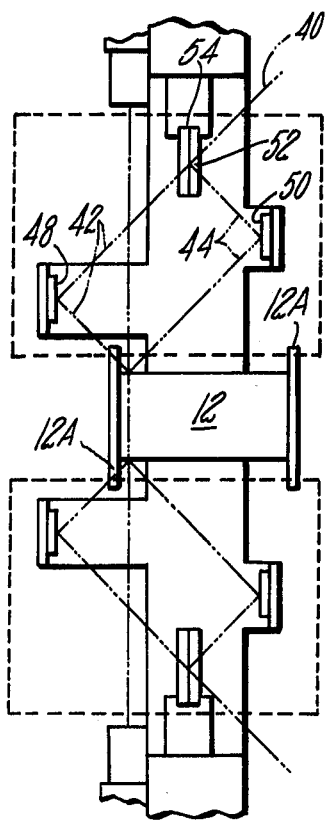
FIG. 3 is a simplified illustration of a portion of the inspection apparatus aligned to a second obstructed region of the vane.
Figure 4:
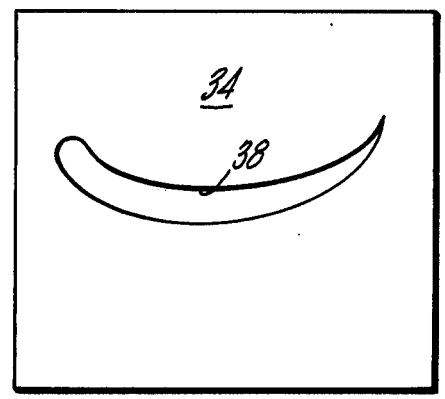
FIG. 4 is a view of the cross section image on the display screen.

The beam splitter 54 is a key element of the system 46. Beam splitters are well known in the optic field and conventionally comprise a partially transmissive, partially reflective material sandwiched between a pair of protective glass sheets. In a preferred embodiment the material is fifty percent (50%) reflective and fifty percent (50%) transmissive. Accordingly, fifty percent (50%) of the light energy traveling along the first segment 42 transmits through the material to the composite path 40 and fifty percent (50%) of the light energy traveling along the second segment 44 reflects to the composite path 40. The reflected portion from the segment 42 and the transmitted portion from the segment 44 are not utilized in the embodiment shown and are not illustrated. The light energy traveling along the composite path 40 has an intensity approximate to the intensity of conventional viewing techniques. In the partially obstructed regions, as illustrated in FIGS. 2 and 3, the intensity of the light energy is reduced; however, the image remains on the display screen.

The lens viewing angle $\theta$, via the offset pattern mirrors 32 is preferably within the range of five (5) to forty-five (45) degrees. A viewing angle of twenty (20) degrees is considered optimum. A greater viewing angle increases the ability of the apparatus to see around obstructions on the article inspected. A lesser viewing angle improves the sensitivity of the apparatus to minute contour variations. The imaging lens is optimized for acceptance of incident light energy at an angle $\phi$ to the optical axis. Accordingly, for maximized resolution in each system the offset distances (b and b') of all the pattern mirrors 32 are equal.

The inspection device described is known as an "on-axis system". "Off-axis" viewing systems, including those employing imaging mirrors, may equally benefit from the use of the composite viewing apparatus and method described.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of my invention, that which I claim as new and desire to secure by Letters Patent of the United States is:

1. Contour inspection apparatus of the type having an imaging element for projecting the image of a light pattern on the article to be inspected wherein the improvement comprises:
   a first forming mirror and a second forming mirror which bracket the light pattern on the article to be inspected; and
   a beam splitter which is optically aligned with said first and second mirrors to form a composite optical path comprising a first segment reflected from said first forming mirror and a second segment reflected from said second forming mirror.

2. The invention according to claim 1 wherein said apparatus has an axis and wherein the viewing angle $\theta$ along the first and second path segments with respect to that axis is within the range of five degrees (5°) to forty-five degrees (45°).

3. The invention according to claim 2 wherein said viewing angle $\theta$ is approximately twenty degrees (20°).

4. The invention according to claim 3 which includes means for producing a sheet of light energy which at incidence with the article forms said light pattern.

5. The invention according to claim 4 wherein said first and second forming mirrors are parallel and wherein said means for producing said light energy is adapted to form said sheet in parallel relationship to said first and second parallel forming mirrors.

6. The invention according to claim 5 for inspecting cross section contour wherein said means for producing light energy is adapted to form said sheet in coincidence with the plane of the cross section to be inspected.

7. For inspecting the cross section contour of an article, apparatus having components oriented about an axis which is perpendicular to the plane of the cross section to be inspected, including:
   a base structure for supporting the components of the apparatus;
   means attached to the base structure for projecting a light pattern onto an article at the cross section to be inspected;
   a first forming mirror and a second forming mirror which bracket the plane of the cross section to be inspected; and
   a beam splitter which is optically aligned with said first and second mirrors to form a composite optical path comprising a first segment reflected from said first forming mirror and a second segment reflected from said second forming mirror.

8. The invention according to claim 7 which further includes:
   a display screen attached to the base structure and oriented perpendicularly to the axis of the apparatus;
   an imaging lens which is attached to the base structure, the optical axis of the lens being coincident with the axis of the inspection apparatus, for projecting said light pattern to said display screen; and a pattern mirror attached to the base structure at a point offset from the axis of the inspection apparatus, the pattern mirror being adapted to reflect said light pattern on the article, as viewed along said composite optical path, to said imaging lens.

9. A method for viewing cross section contour of an article, comprising the steps of:

projecting a light pattern onto the article at the cross section to be inspected;

viewing said light pattern along a composite optical path, including viewing said light pattern from a first direction through a beam splitter as reflected by a first forming mirror and viewing said light pattern from a second direction as reflected by the beam splitter and as reflected by a second forming mirror, wherein said forming mirror and beam splitter are aligned to form said composite optical path to the light pattern on the article; and forming an image of the light patern as viewed along said composite optical path.

* * * * *